UNITED STATES PATENT OFFICE.

EBEN N. HIGLEY, OF GREAT FALLS, ASSIGNOR OF ONE-HALF TO TREFETHEN, SALTMARSH & WILLEY, OF DOVER, NEW HAMPSHIRE.

GLASS FOR THE MANUFACTURE OF WATER, DRAIN, AND SEWER PIPES.

SPECIFICATION forming part of Letters Patent No. 288,056, dated November 6, 1883.

Application filed October 1, 1883. (No specimens.)

*To all whom it may concern:*

Be it known that I, EBEN N. HIGLEY, a citizen of the United States, residing at Great Falls, in the county of Strafford and State of New Hampshire, have invented an Improvement in Glass for the Manufacture of Water, Drain, and Sewer Pipes; and I hereby declare the following to be a full, clear, and exact description thereof.

My invention has for its object to produce an exceedingly hard, strong, and tough glass, which is especially adapted as a material from which to make water, drain, and sewer pipes, and for a variety of other purposes, where great strength and durability are required; and my invention consists in glass composed of silica, slag from smelting-furnaces, porphyry, potash, lime, rock-salt, oxide of lead, sal-ammoniac, and alum mixed and fused together, as hereinafter more particularly set forth.

In carrying my invention into effect I take fifty parts of silica, fifteen parts of slag from smelting-furnaces, crushed or pulverized, ten parts of porphyry, crushed or pulverized, ten parts of potash, five parts of unslaked lime, four parts of rock-salt, three parts of oxide of lead, two parts of sal-ammoniac, and one part of alum, and place them in a suitable receptacle and thoroughly mix and incorporate them together in the usual manner, after which the compound thus formed is placed in an ordinary crucible used in making glass, and fused, when it is drawn out into molds or worked in the same manner as ordinary glass.

The proportions of the above-named ingredients may be slightly varied, if desired, without departing from the spirit of my invention.

The above-described glass can be made of any color desired by the addition thereto of any of the well-known coloring substances adapted for the purpose.

The employment of porphyry, which is an inexpensive ingredient, renders the glass exceedingly strong and tough, and capable of withstanding blows and hard usage without fracture, besides giving it a brilliant appearance. The sal-ammoniac and potash render the glass less brittle, and consequently much more durable than ordinary glass, while the rock-salt accelerates the operation of fusing the ingredients together, and tends to prevent the formation of air-bubbles in the mass.

Glass composed of the materials above described is comparatively inexpensive, as but a very small proportion of oxide of lead is used, which substance is one of the most expensive ingredients heretofore used in the manufacture of glass; and my improved glass is on this account particularly adapted for use in the manufacture of water, drain, and sewer pipes, and for an infinite variety of other purposes where a clean hard surface is required, combined with great strength and durability.

What I claim as my invention, and desire to secure by Letters Patent, is—

1. As a new article of manufacture, glass composed of silica, slag, porphyry, potash, lime, rock-salt, oxide of lead, sal-ammoniac, and alum mixed and fused together in about the proportions named, substantially as and for the purpose set forth.

2. The employment of porphyry and sal-ammoniac in combination with other ingredients in the formation of a composition for the making of glass, substantially as and for the purpose described.

Witness my hand this 25th day of September, A. D. 1883.

EBEN N. HIGLEY.

In presence of—
JOHN KIVEL,
JAMES H. DAVIS.